(No Model.)
G. SCHNEIDER.
FOOD COOKER AND BOILER.
No. 547,686. Patented Oct. 8, 1895.
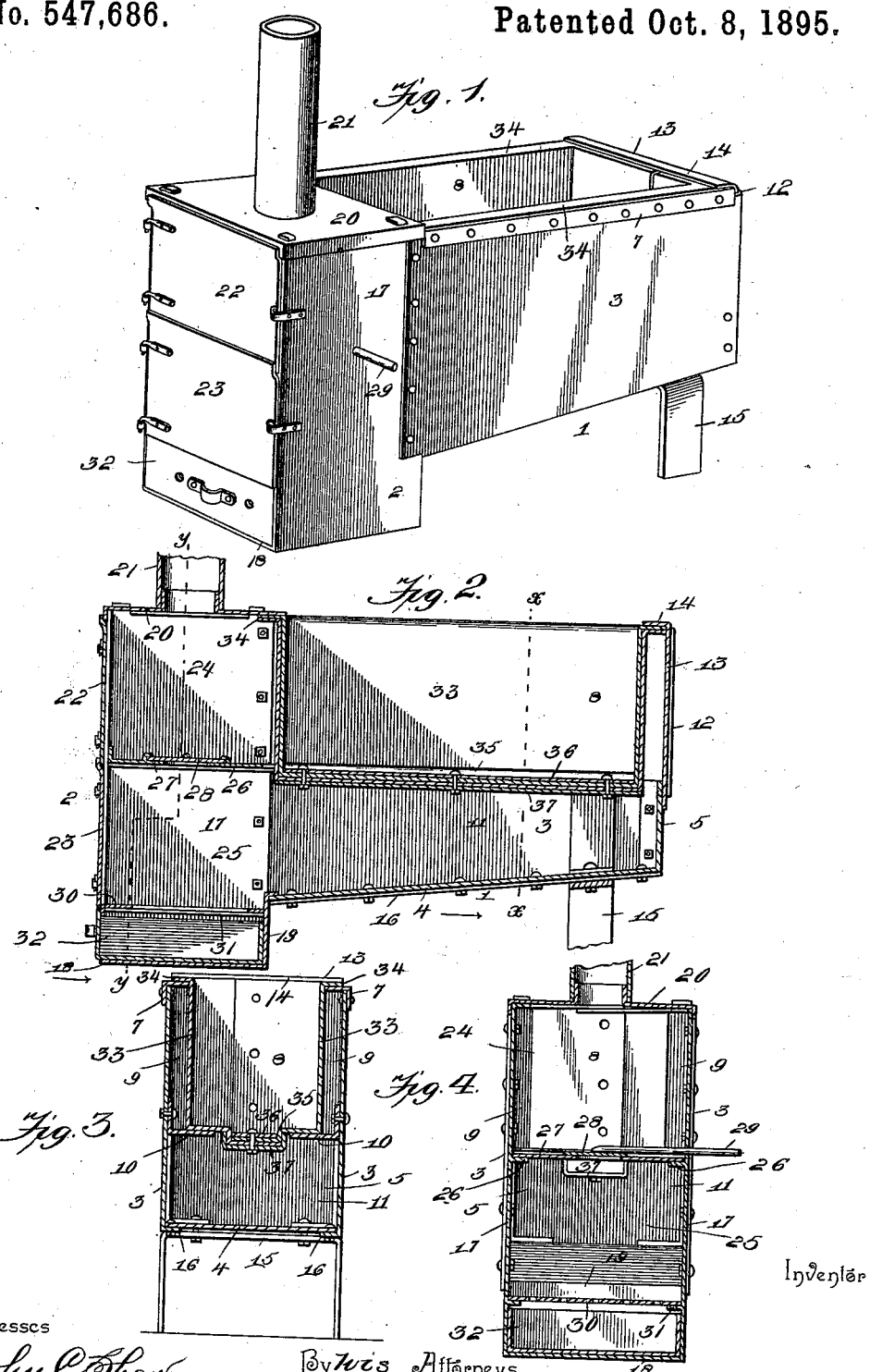
Witnesses
John C. Shaw
V. B. Hillyard
Inventor
Gottlieb Schneider
By his Attorneys,
C. A. Snow & Co.

UNITED STATES PATENT OFFICE.

GOTTLIEB SCHNEIDER, OF KENDALLVILLE, INDIANA.

FOOD COOKER AND BOILER.

SPECIFICATION forming part of Letters Patent No. 547,686, dated October 8, 1895.

Application filed May 23, 1895. Serial No. 550,383. (No model.)

*To all whom it may concern:*

Be it known that I, GOTTLIEB SCHNEIDER, a citizen of the United States, residing at Kendallville, in the county of Noble and State of Indiana, have invented a new and useful Food Cooker and Boiler, of which the following is a specification.

This invention relates to certain new and useful improvements in food-cookers where10 by economy in the consumption of fuel is attained and whereby the pan or boiler can be cooled and removed from the heater, if necessary, without requiring the drawing of the fire.

The chief object of the invention is the provision of a structure whose parts can be readily assembled and secured together and in which any part is readily accessible and removable for repairs or any required purpose and which will perform the required service in a thorough, rapid, and satisfactory manner.

Other objects and advantages will become apparent as the nature of the invention is unfolded by the following description and the drawings hereto attached.

Figure 1 is a perspective view of a foodcooker constructed in accordance with the principles of the present invention. Fig. 2 is a longitudinal section thereof. Fig. 3 is a cross-section of the complete structure on the line X X of Fig. 2, looking to the right, as indicated by the arrow. Fig. 4 is a vertical section of the complete device on the line Y Y of Fig. 2, looking in the direction designated by the arrow.

The device comprises, essentially, a heater and a pan or boiler to receive the food to be cooked or the water to be heated. The heater comprises a horizontally-disposed smoke-box 1 and a vertically-arranged fire-box 2, which are secured together in any desired way, preferably by having the sides 3 of the smoke-box 1 bolted to the inner vertical edge portions of the fire-box 2, thereby admitting of the parts 1 and 2 being readily separated for any required purpose. The bottom 4 of the smokebox has its rear end portion 5 extending vertically for a short distance and touching the inner sides of the parts 3 and is supported upon inwardly-extending flanges 6, formed at the lower edges of the sides 3 and secured to said flanges by bolts or like removable fastenings. Angle-irons 7 are secured to the upper edges of the sides 3, and their horizontal portions extend inwardly and touch the sides of the pan or boiler 8 and position the latter so as to provide hot-air passages 9 between the sides of the pan or boiler and the opposing faces of the sides 3. Corresponding angle-irons 10 are oppositely disposed and secured to the sides 3 a short distance from the bottom 4 and are adapted to form supports for the pan or boiler 8 and form closures for the lower sides of the hot-air passages 9, and these angle-irons 10 terminate at their rear ends a short distance from the vertical portion 5, so as not to obstruct the passage of the hot air from the space 11 below the bottom of the pan or boiler 8 to the passages 9. The rear ends of the sides 3 have inwardly-extending flanges 12, which are adapted to retain in proper position the plate 13, which closes the space between the sides 3 and above the part 5, and this plate 13 has a flange 14 at its upper edge, which is adapted to extend over the angle-irons 7 and support the said plate 13 in proper position. The plate 13 is confined at its lower end between the top edge of the part 5 and the flanges 12, and at its upper end between the angle-irons 7 and the said flanges 12, and by removing the plate 13 the pan or boiler 8 can be easily and readily withdrawn from the heater for any desired purpose. The leg-section 15, for supporting the rear end of the smoke-box, is of an inverted-U shape and is secured to the bottom 4 by bolts passing vertically through the horizontal portion of the leg-section, the bottom 4, and inwardly-extending lugs 16 provided on the inner faces of the sides 3, and this leg-section supports the rear portion of the bottom 4 and relieves the inwardly-extending flanges 6 of undue strain. The lugs 16 extend vertically for a short distance along the inner faces of the sides 3 and engage with the rear ends of the angle-irons 10 and bracingly support the latter against the weight of the pan or boiler 8 when the latter is supplied with the food to be cooked or the water to be heated.

The fire-box comprises similar sides 17, a bottom 18, having its rear portion 19 extending vertically and forming a close joint with the front end of the bottom 4, and a removable top 20, which is fitted with a smoke-stack 21. The front side of the fire-box is closed by doors 22 and 23, the upper door 22 admitting of access to the smoke-chamber 24, formed in the upper portion of the fire-box, and the lower door 23 providing for access to the combustion-chamber 25. Ribs 26 are formed on the inner faces of the sides 17 in line with the horizontal portions of the angle-irons 10 and are adapted to support a horizontal partition 27, which separates the fire-box and forms the two chambers 24 and 25. This partition 27 has an opening which is adapted to be closed by a sliding damper 28, by means of which the heat and products of combustion are caused to circulate through the smoke-box and around the pan or boiler, or by means of which they are afforded a direct passage to the smoke-stack 21, as will be readily understood. The damper 28 has its stem 29 extending through a side of the fire-box, so as to be readily grasped when it is required to operate the damper for the purpose of attaining the proper direction of passage for the products of combustion to the smoke-stack.

The fire-grate 30 is supported upon ribs or flanges 31, formed on the inner faces of the sides 17, and may be of any approved construction, and the ash-pit formed below the said grate is supplied with an ash-pan 32 for the usual purpose. The fire-grate 30, like the horizontal partition 27, is removably supported within the fire-box, so as to be displaced at pleasure for any reason.

The pan or boiler 8 is constructed of similar side pieces 33, which have their end portions bent inwardly and overlapping and the lower parts likewise bent inward and having the edge portions overlapping, the said parts being secured together by fastenings passing through the overlapping edge portions, as will be readily understood. The pan or boiler is provided at its upper end with an outwardly-extending flange 34, which extends over the contiguous portions of the top 20, flange 14, and the angle-irons 7, whereby a close joint is attained and the heat confined in the passages 9 until it performs the required work. The bottom of the pan or boiler is formed with a longitudinal depression 35 and is strengthened by means of a plate 36, placed on the inner side of the depression 35, and by a channel-iron 37, arranged exterior to the bottom and opposite the said longitudinal depression 35, the plate 36 and channel-iron 37 being secured together by fastenings passing through these parts and the depressed portion of the bottom.

When the parts are assembled and the pan or boiler is in proper position, a hot-air space 11 is formed beneath the said pan or boiler, a corresponding space 38 in the rear thereof, and the hot-air passages 9 at its sides. The fire being started upon the grate 30 and within the combustion-chamber 25 and the damper 28 being open, the smoke and gases find a direct passage to the smoke-stack 21, and after the fire has burned sufficiently and when it is required to heat the contents of the pan or boiler the damper 28 is closed, thereby compelling the heat and products of combustion to pass through the space 11 beneath the boiler, thence vertically into the space 38 in the rear thereof, and forwardly through the hot-air passages 9 at the sides of the boiler into the smoke-chamber 24, and out through the smoke-stack 21, thereby completely enveloping the pan or boiler in a hot-air medium, whereby its contents are quickly heated, and whereby the fuel is utilized to the best possible advantage, as will be readily understood.

The invention can be applied to the various makes and styles of food-cookers, and in the embodiment of the same various changes in the form, proportion, and the minor details of construction may be resorted to without departing from the principle or sacrificing any of the advantages of this invention.

Having thus described the invention, what is claimed as new is—

1. A device of the character described, comprising a vertically arranged fire-box, and a relatively horizontal smoke-box forming a continuation of the fire-box, and having longitudinally and inwardly extending portions at the top edges of and a short distance from the bottom of its sides, a pan or boiler supported upon the lower inwardly extending portions and of less width than the distance between the sides of the smoke-box, and having a hot air space at its bottom, ends and sides, and a horizontal partition arranged in the fire-box about in the plane of the lower inwardly extending portions and provided with a damper controlled opening, whereby the heat can be compelled to pass around the said pan, or directly through the fire-box, substantially in the manner set forth, for the purpose described.

2. A device of the nature specified, comprising a vertically disposed fire-box, and a relatively horizontal smoke-box, the latter having upper and lower inwardly extending portions at its sides, a pan or boiler located within the upper portion of the smoke-box and supported upon the lower inwardly extending portions, and having a hot air space at its bottom, ends and sides, a fire grate removably inserted within the lower portion of the fire-box, a smoke stack communicating with the upper portion of the fire-box, and a horizontal partition removably supported within the fire-box and located in the plane of the said lower inwardly extending portions, and having a damper controlled opening, whereby the heat may be caused to circulate around the said pan or boiler, or pass directly through the fire-box to the said smoke stack, substantially as set forth, for the purpose described.

3. In a food cooker, the herein-described pan, a boiler, comprising similar side pieces which have their bottom and end portions bent inwardly and overlapping and secured together by having fastenings passed through the overlapping edge portions, the bottom of the device having a longitudinal depression in which is fitted a plate, and having a channel iron placed exterior to the depressed part, the said plate and channel iron being secured together by positive means, substantially as set forth.

4. The herein-specified device for the purposes aforesaid, comprising a fire box having its sides provided with inner extensions, a fire grate, and a horizontally-disposed partition removably supported upon the said inner extensions, and the partition being provided with a damper-controlled opening, a smoke box extending horizontally from the fire box and provided with inner flanges at the top and a short distance from the bottom edges at its sides, a removable plate for closing the rear portion of the smoke box, and a pan, or boiler, supported within the smoke box by the lower side extensions and properly positioned by the top side extensions, and having an outer flange at its upper end, and said pan, or boiler, being surrounded at its bottom, ends and sides by a hot-air space through which the heat and products of combustion are caused to circulate by the said damper controlling the opening in the horizontal partition, substantially as set forth.

In testimony that I claim the foregoing as my own I have hereto affixed my signature in the presence of two witnesses.

GOTTLIEB SCHNEIDER.

Witnesses:
   W. S. OSBORNE,
   H. J. LONG.